Sept. 24, 1935.  S. W. FRANSSON  2,015,517

SHOVEL

Filed Feb. 20, 1934    2 Sheets-Sheet 1

Inventor

Sven W. Fransson,

By James F. Duhamel

Attorney

Sept. 24, 1935.   S. W. FRANSSON   2,015,517
SHOVEL
Filed Feb. 20, 1934   2 Sheets-Sheet 2
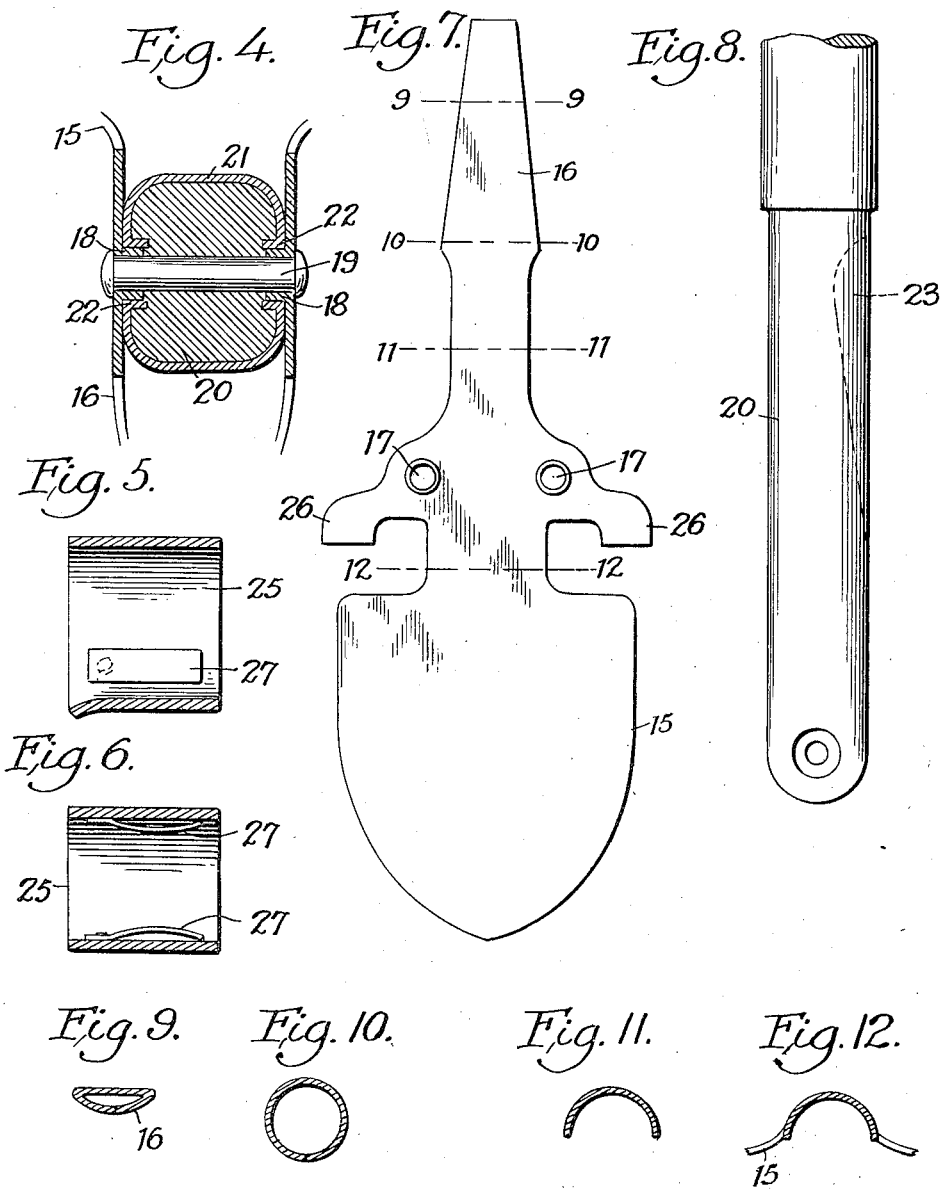

Patented Sept. 24, 1935

2,015,517

UNITED STATES PATENT OFFICE 2,015,517

SHOVEL

Sven W. Fransson, Newark, N. J.

Application February 20, 1934, Serial No. 712,235

1 Claim. (Cl. 306—18)

This invention relates to shovels combined with other tools such as a pick and is an improvement on the patent granted to me December 18, 1907 and numbered 1,250,839, the object of the present invention being to strengthen the handle of the pivoted shovel and pick by reinforcing the lower end and forming trunnions on the shovel at its pivotal point. A further object of the invention is to provide a groove or socket for the pick end of the device and means for holding the shovel or pick in its preferred position.

These and other objects and details of the invention are more fully described in the following specification, set forth in the appended claim and illustrated in the accompanying drawings wherein:

Fig. 4 is a cross sectional view on the line 4—4 of Fig. 3.

Figs. 5 and 6 are sectional views of the locking ferrule.

Fig. 7 shows the shovel and pick blank.

Fig. 8 is a detail view of the lower end of the handle.

Figure 2:
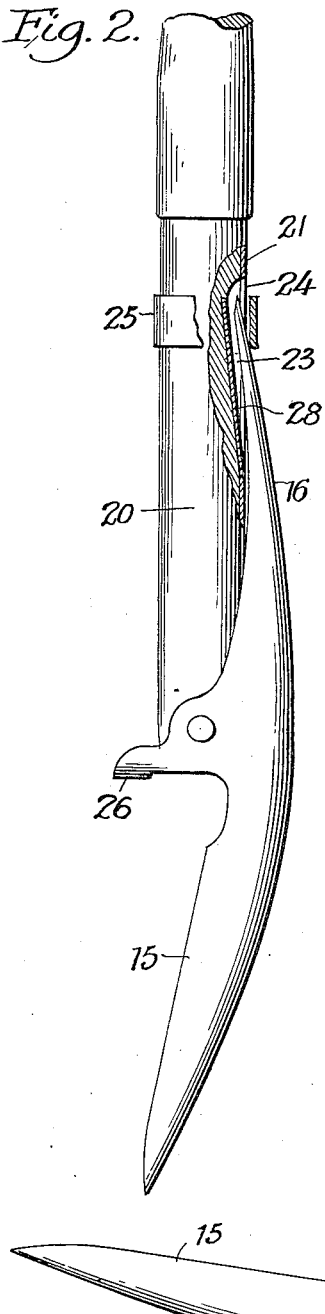
Fig. 2 is an elevation of the lower end of the device showing the shovel in position for operation.
Figure 1:
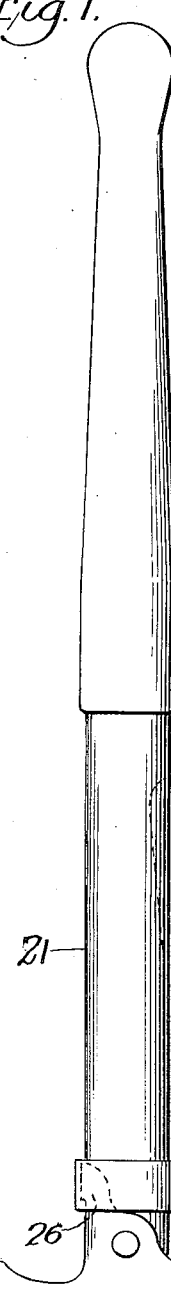
Figure 1 is a side view of the improved shovel with the pick in position to function.
Figure 3:
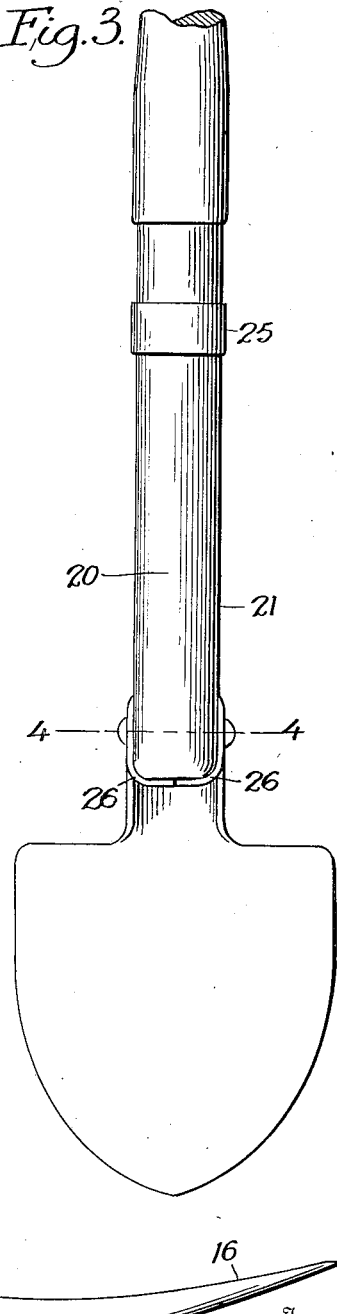
Fig. 3 is a face view of the lower end of the shovel.

Figs. 9, 10, 11, and 12 are cross sectional views on the correspondingly numbered dotted lines on Fig. 7.

In shovels of this nature as heretofore made there have been various elements of weakness considering the rough and heavy work these tools are subjected to and it is to overcome these defects that the present construction is provided for.

The shovel 15 and the pick 16 are stamped from sheet metal as shown in Fig. 7 and the portion above the shovel blade is rounded and the pick section is turned in on the edges to reinforce or strengthen that part and render it serviceable.

Midway of the shovel and pick are perforations 17 with the edges struck-up to form bearings 18 on the pivot pin 19 and the lower end 20 of the handle is reduced and covered with a metal sleeve 21 also having perforations with struck-up edges 22 entering openings in the handle as will be seen in Fig. 4

The upper part of the reduced portion 20 has a groove cut in it at 23 and the sleeve 21 also has a correspondingly located slot 24 into which the pick is housed when not in use and it is locked therein when the shovel only is used by a sliding ferrule 25 that may also be slid down the handle and be located over the ears 26 to lock the pick in its operable position.

The construction of the ferrule 25 is best shown in Figs. 5 and 6 and where it will be seen that frictional springs 27 are located on the interior walls to prevent too free movement of the ferrule and that retain it where preferably located.

The blank of the device, as shown in Fig. 7, is stamped from sheet metal as usual and the holes 17 punched at the same time. The shovel is then formed by bending the parts as shown on enlarged scales in Figs. 9 to 12.

The sleeve 21 is adapted to reinforce the lower end of the handle and to cover it completely. It is secured thereto by the tongue 28 which is forced into the groove 23 and prevents longitudinal and rotary movement of the sleeve.

It is obvious that the parts may be modified or otherwise arranged without departing from the essential features above described or from the scope of the appended claim.

What I claim as new is:

In a shovel, the combination of a handle having a perforation in its lower end, a sleeve about the said lower end and having a hole with flanged edges at the perforation of the handle, a shovel with a pick at one end and having a midway hole with flanged edges to enter the sleeve hole and form trunnions, a pivot-bolt to enter the holes and perforation, ears on the shovel adjacent the trunnions, and a ferrule sliding on the sleeve and adapted to encircle the pick or the said ears.

SVEN W. FRANSSON.